United States Patent
Adelman

(10) Patent No.: US 11,920,627 B2
(45) Date of Patent: Mar. 5, 2024

(54) SMALL OBJECTS OPTIMIZED CARABINER

(71) Applicant: Nite Ize, Inc., Boulder, CO (US)

(72) Inventor: Gregory M. Adelman, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 18/058,379

(22) Filed: Nov. 23, 2022

(65) Prior Publication Data

US 2023/0332637 A1    Oct. 19, 2023

Related U.S. Application Data

(60) Provisional application No. 63/332,151, filed on Apr. 18, 2022.

(51) Int. Cl.
  *F16B 45/02*    (2006.01)
  *A47G 29/10*    (2006.01)

(52) U.S. Cl.
  CPC ............ *F16B 45/023* (2021.05); *A47G 29/10* (2013.01); *F16B 45/027* (2021.05); *F16B 45/037* (2021.05)

(58) Field of Classification Search
  CPC .... F16B 45/023; F16B 45/027; F16B 45/037; A47G 29/10
  See application file for complete search history.

(56) References Cited

U.S. PATENT DOCUMENTS

| | | | |
|---|---|---|---|
| 2,465,328 A * | 3/1949 | Modrey | A47G 29/10 70/459 |
| D272,717 S | 2/1984 | Faidide | |
| D281,483 S | 11/1985 | Faidide | |
| D284,933 S | 8/1986 | Murphy | |
| D296,418 S | 6/1988 | Kasai | |
| D299,480 S | 1/1989 | Harari | |
| 5,005,266 A * | 4/1991 | Fister | F16B 45/02 24/601.5 |
| 5,577,304 A | 11/1996 | Simond | |
| D389,424 S | 1/1998 | Montaquila | |
| D407,301 S | 3/1999 | Donalies | |
| 5,878,834 A * | 3/1999 | Brainerd | F16B 45/02 24/DIG. 35 |
| 5,913,479 A * | 6/1999 | Westwood, III | F16B 45/02 24/600.9 |
| D455,642 S | 4/2002 | Kelleghan | |
| D468,997 S | 1/2003 | Chang | |

(Continued)

OTHER PUBLICATIONS

International Search Report and Written Opinion for International Application No. PCT/US2023/018475 dated Jun. 28, 2023.

*Primary Examiner* — David M Upchurch
(74) *Attorney, Agent, or Firm* — Potomac Law Group, PLLC

(57) ABSTRACT

Embodiments are directed to a carabiner that includes a carabiner body forming an opening having a width, the carabiner body including a gate rest notch, and a gate rest. The carabiner further includes a pivotable gate coupled to the carabiner body at a pivotable point and adapted to contact the gate rest notch when in a closed position. The carabiner body is sized to accommodate an object with an aperture and a thickness, and the width is approximately less than 100% greater than the thickness.

20 Claims, 6 Drawing Sheets

(56) References Cited

U.S. PATENT DOCUMENTS

| | | | |
|---|---|---|---|
| 6,622,354 B1* | 9/2003 | Klingier | F16B 45/02 24/599.6 |
| D485,431 S | 1/2004 | Hsu | |
| D508,397 S | 8/2005 | Volk et al. | |
| D528,406 S | 9/2006 | Kramer | |
| D637,473 S | 5/2011 | Mitchell | |
| D698,625 S | 2/2014 | Liang | |
| D730,722 S | 6/2015 | Grimm et al. | |
| D743,778 S | 11/2015 | Huang | |
| D809,370 S | 2/2018 | Tang | |
| D814,271 S | 4/2018 | Berman | |
| D833,855 S | 11/2018 | Page | |
| D854,401 S | 7/2019 | Adelman | |
| D856,118 S | 8/2019 | Adelman | |
| D876,934 S | 3/2020 | Adelman | |
| 10,578,148 B1 | 3/2020 | Anderson et al. | |
| D934,663 S* | 11/2021 | Adelman | F16B 45/023 D8/356 |
| D954,539 S | 6/2022 | Grossman | |
| 11,585,370 B1* | 2/2023 | Christianson | F16B 45/029 |
| 11,629,749 B2 | 4/2023 | Adelman | |
| 2008/0104810 A1* | 5/2008 | Liang | F16B 45/02 24/600.2 |
| 2011/0138586 A1* | 6/2011 | Gompert | F16B 45/02 24/599.4 |
| 2012/0297590 A1 | 11/2012 | Spataro et al. | |
| 2015/0231423 A1* | 8/2015 | Perner | A62B 35/0037 24/518 |
| 2016/0255918 A1 | 9/2016 | Grossman | |
| 2016/0341239 A1* | 11/2016 | Inkavesvaanit | F16B 45/02 |
| 2017/0146052 A1 | 5/2017 | Blizzard et al. | |
| 2022/0018384 A1* | 1/2022 | Adelman | A44B 15/00 |

* cited by examiner

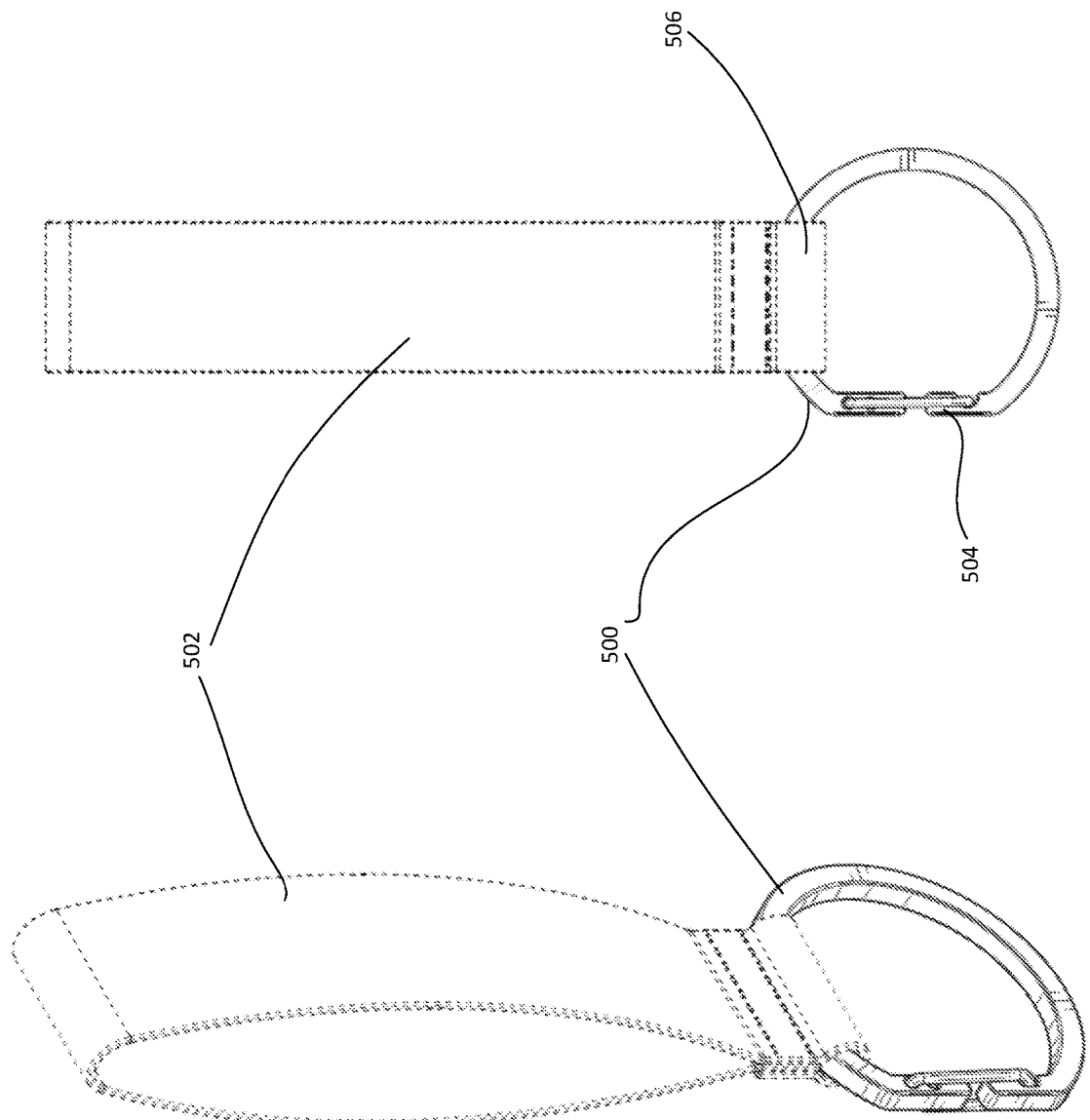

SMALL OBJECTS OPTIMIZED CARABINER

CROSS REFERENCE TO RELATED APPLICATIONS

This application claims priority of U.S. Provisional Patent Application Ser. No. 63/332,151, filed on Apr. 18, 2022, the disclosure of which is hereby incorporated by reference.

FIELD

One embodiment is directed generally to a carabiner, and more particularly to a carabiner optimized to accommodate small objects with apertures such as keys.

BACKGROUND INFORMATION

A carabiner is a specialized type of shackle generally implemented as a metal loop with a spring-loaded gate used to quickly and reversibly connect components, most notably in safety-critical systems. In various scenarios, carabiners are useful for hikers, fishermen, outdoorsmen, travelers, and a variety of other users. Carabiners may be used to tie objects down, connect one object to another, etc. In many scenarios, users utilize carabineers for holding keys or other items, such as a keyring to hold one or more keys, and as a means to attach one or more keys to another object. However, the security of the keys or other objects on the carabiner is at issue, as well as the usability of the device.

In general, known "carabiners" (e.g., clips, shackles, spring loaded metal loops, accessory carabiners, etc.) have a relatively large opening in proportion to its overall size, or the opening is usually as large as possible consistent with the design of the carabiner. The large opening generally improves the function of the carabiner because it allows the carabiner to attach/clip to a large range of objects.

The openings typically start near the top (i.e., swinging) end of the carabiner gate. This start position is typically optimal because it allows for the largest opening when the gate swings open, which allows the carabiner to make optimal use of the opening in the carabiner body by accepting a large range of objects (small to large). Most known carabiners also do not directly accept keys, or other objects, with generally small apertures as the cross-section of the carabiner body is generally too large.

SUMMARY

Embodiments are directed to a carabiner that includes a carabiner body forming an opening having a width, the carabiner body including a gate rest notch, and a gate rest. The carabiner further includes a pivotable gate coupled to the carabiner body at a pivotable point and adapted to contact the gate rest notch when in a closed position. The carabiner body is sized to accommodate an object with an aperture and a thickness, and the width is approximately less than 100% greater than the thickness.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 5A is a perspective view and FIG. 5B is a side view of a ring link carabiner with a strap in accordance to an embodiment.

DETAILED DESCRIPTION

Figures 1A, 1B:
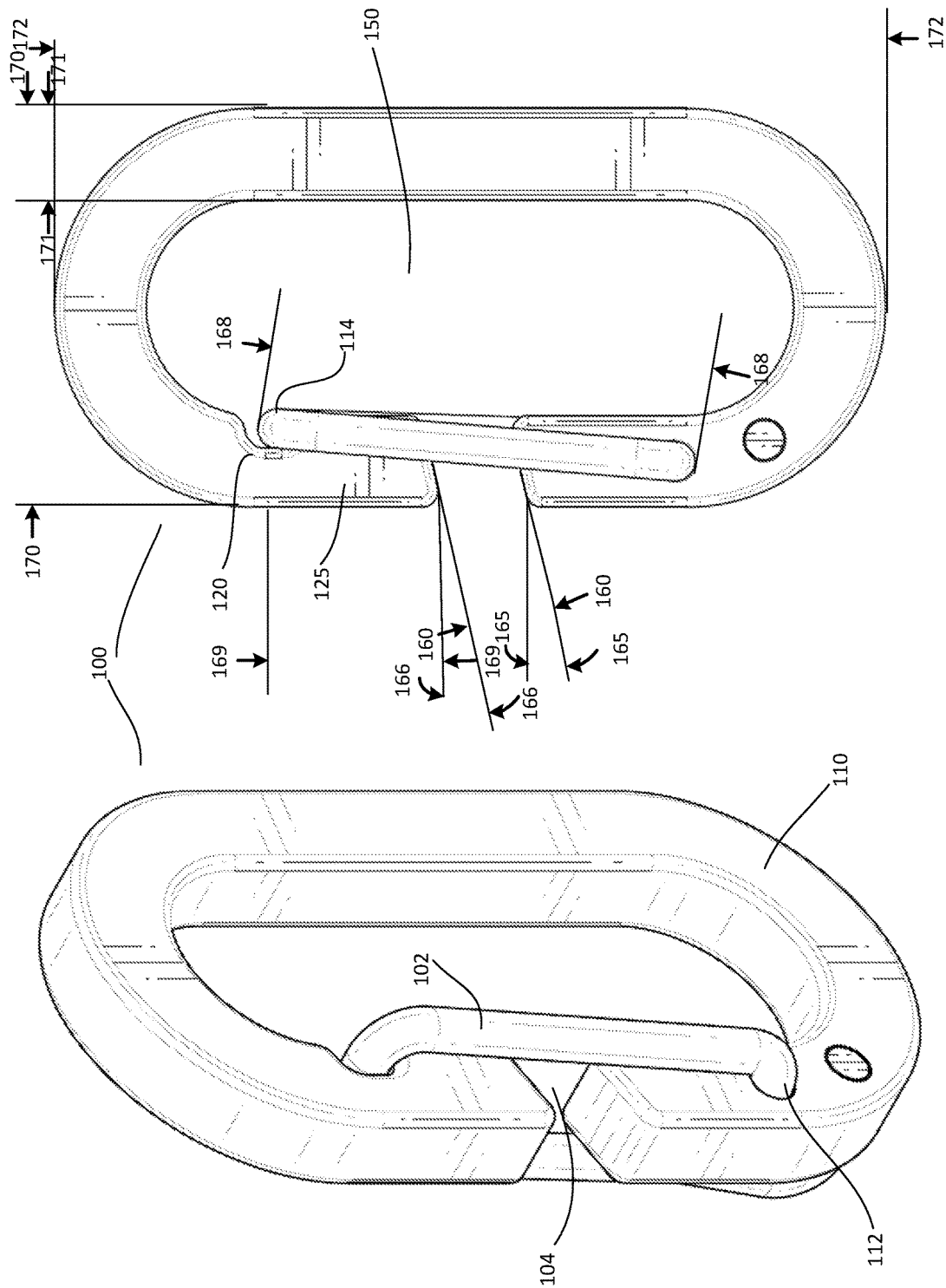
FIG. 1A is a perspective view and FIG. 1B is a side view of a carabiner in accordance to an embodiment.

One embodiment is a carabiner optimized for objects with small apertures, such as keys. Embodiments are optimized due to one or more novel features, including a size of the gate opening, a position of the gate opening, the angles of the edges of the gate opening, which relates to the overall size of the carabiner, a size of a gate rest notch, a gate rest extension, and the cross-sectional size of the carabiner body.

As disclosed, known carabiners typically have a relatively large opening to accommodate a large range of objects. One problem with this known and common design is that it also results in a carabiner that is not very secure for smaller objects (e.g., keys, keyrings and other thin/small objects that do not need or make use of the large opening). These objects can relatively easily fall off the carabiner and result in the loss of important items that were presumed to be held securely by the carabiner. A number of factors contribute to this low level of security, including that the relatively large opening creates an easy path for smaller objects to exit the opening.

One of the reasons this problem exists is that the carabiner is not optimized for the intended use. It is designed to accept a wide range of objects and the trade-off is a much reduced security for smaller objects. In contrast, embodiments optimize the design of the carabiner for specific uses, such as holding keys as a better alternative to known keyrings. The optimization in embodiments improves security and also minimizes the size of the carabiner when desired.

Embodiments of the invention perform better than known keyrings, such as split rings, in general, because it is easier to open and close to add and remove keys and other objects, and to open and close to attach itself and the keys to other objects, such as a belt loop, fob, backpack or pocket-tool. And, most known carabiners generally do not accept keys and similar objects with small apertures such as keyholes directly onto their bodies, because the cross-sectional dimensions of their body does not fit into the aperture or keyhole of the keys. Further, even if the cross-sectional dimensions of their bodies are reduced so keys fit directly onto them, they generally do not hold keys securely. Some known carabiners address this by having an integrated locking mechanism to lock the carabiner gate in the closed position and therefore hold keys securely, but the disadvantages of these locking designs are that they require the user to intentionally unlock and lock it with each use, and if it is not locked or opens inadvertently it will be unsecure.

In contrast, carabiners in accordance to embodiments solve these security problems by being optimized for their specific uses, rather than being more universal and accepting a large range of objects. This optimization includes one or more novel features, including an optimized gate opening size and gate opening position and angles on the edges of the gate opening, a size and depth of a gate rest notch, a gate rest extension and a size of the carabiner body. When one or more of these features are combined in these embodiments they result in increasingly or more secure carabiners that are simple to use because they still function in a similar way to common carabiners (i.e., do not require locking and unlocking), and their high level of security is inherent in their designs. The more of these features that are used together in the design the higher the level of security.

Embodiments include changes to the inherent design of known carabiners so that they can be used to hold keys directly (i.e., key-optimized cross-sectional dimensions, where "key-optimized" is used to describe the body of the carabiner being small enough in cross-sectional dimensions to fit through the apertures of most common keys) and is naturally and inherently more secure when used in everyday use, as opposed to adding specific locking features onto the carabiner that the user has to intentionally operate or take a specific action to lock or unlock with each use. The advantage of embodiments over carabiners with a locking feature is that they function well, whether locked or unlocked, and are secure all the time. With a locking carabiner, if the user forgets to lock it with each use or the lock opens on its own accidently (or the lock fails) it stops being secure and serving its intended use. Embodiments are also easier to use because they do not require an extra step to achieve the enhanced security, or require an additional step to unlock them before being able to remove the key or other object from them.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures and components have not been described in detail so as not to unnecessarily obscure aspects of the embodiments. Wherever possible, like reference numbers will be used for like elements.

FIG. 1A is a perspective view and FIG. 1B is a side view of a carabiner 100 in accordance to an embodiment.

Carabiner 100 includes a carabiner body 110 and a spring loaded gate 102 that gates opening 104. Gate 102 includes a pivot point 112 on one side, and the other side 114 rests on a gate rest notch 120 when not being flexed inwards by a user. When closed, gate 102 and body 110 form a carabiner chamber 150. A gate rest 125 extends from gate rest notch 120 and can be considered a "gate rest extension" 125 because of its longer length relative to the size of carabiner body 110 in comparison to generally known carabiners.

Carabiner body 110 includes a long edge/side/axis when upright in the vertical direction (i.e., in the upright direction as shown in FIG. 1), and a short edge/side/axis when upright in a horizontal direction. In embodiments of carabiner 100, the overall length in the vertical direction at the outside edges, at 172, is approximately 1.00" and width in the horizontal direction at the outside edges, at 170, is approximately 0.480". In embodiments, the cross section of carabiner body 110 is optimally sized to accept keys (i.e., small enough to fit through the typical hole/aperture of a typical key). In one embodiment, the cross section of carabiner 100, which is a rectangular shape, is approximately 0.110" at 171, and approximately 0.094" in the other dimension (i.e., the material thickness).

Embodiments include a number of novel features, either alone or in combination, to achieve the above-described advantages over known carabiners. These features are directed to the size, positioning and angles of the edges of the opening 104 in carabiner body 110, gate rest extension 125, the design of gate notch 120, and the size of carabiner body 110. These novel features are disclosed below.

In embodiments, the size (i.e., the width, indicated by distance 160) of opening 104 is reduced from the large opening size found on common carabiners and is just large enough for the intended use, which is to accept all common consumer and industrial key thicknesses. Using common key thicknesses (i.e., in general, for "standard" keys, the key thickness is approximately 0.070-0.085") as a constraint or guide still allows it to accept other related items, such as split rings, etc. For carabiner 100, the width 160 of opening 104 is approximately 0.100". In embodiments such as carabiner 100, the size of width 160 is approximately 0.015"-0.030" plus the maximum key thickness of 0.085", or approximately 0.100"-0.115". In embodiments, in general, the size of width 160 is approximately 17%-22% greater than the maximum object/key thickness.

Further, a length of gate 102 at 168 is approximately 0.520". Therefore, the size of width 160 relative to the length of gate 102 at 168 in embodiments is approximately 17-24%, while in other embodiments the size of the width relative to the length of the gate is approximately 17-38%.

This minimum necessary size opening, which is slightly larger than the maximum thickness of common consumer and industrial keys, on its own improves the security of the carabiner in a few ways. The small opening makes it more difficult for a key or other intended "small" object to inadvertently fall off of it. This is partially because the path to fall off is narrower and more complicated for the key to traverse as the opening is reduced.

The small opening size in embodiments also narrows the range of angles that keys can enter the carabiner, which results in a narrow range of angles that they can fall off in the reverse process or direction. Since the opening is so small relative to the key thickness, the key needs to align properly with the two inner edges of the gate opening to enter when loading keys onto the carabiner, and in the reverse process of exiting the carabiner which relates to security, the keys also need to align properly with the two inner edges of the opening to be able to make it through the opening and fall off. On a common carabiner, since the opening is so large relative to the key thickness, it can come or fall off at almost any angle or orientation. The relatively large gate opening size in known carabiners offers little to no restriction or improved security in general and specifically regarding the angle of the key as disclosed.

In embodiments that accommodate a key having a thickness and an aperture for receiving a ring, opening 104 has a width (i.e., 160 of FIG. 1B) dimension less than 100% greater than the thickness. In an embodiments, the dimension is less than 25% greater than the thickness. In an embodiment, the dimension is less than 10% greater than the thickness. In an embodiment, the dimension is less than 5% greater than the thickness. In one embodiment for maximum effectiveness, taking into account manufacturing tolerances, the dimension is approximately 0.015" greater than the thickest key that will potentially be used.

The small opening size 160 relative to the length of the gate 102 (i.e., the portion of the gate that is not overlapping or supported by the carabiner body) in embodiments also reduces the amount of wire gate 102 that is exposed to direct mechanical stresses from the key or other relevant objects. The carabiner body 110 is stronger, larger and more rigid than the wire gate. By having a larger portion of the gate overlapping and/or supported by the carabiner body, the potential failure resulting from the gate bending, opening by force, or breaking, is reduced since the gate is much more flexible and weaker than the carabiner body 110.

In embodiments, the small size of opening 104 allows opening 104 to be positioned further down away from the end 114 of gate 102, and towards the center of the gate 102. The ideal position is approximately at the center of gate 102, but can vary depending on the specific size of gate 102, the size of opening 104 in body 110 and the intended use of the carabiner. Too far up towards the open end of gate 102 and the security is reduced and too far down towards the base of gate 102 and the access or effective/useful opening is reduced because of the limits to the range the gate can swing inwardly and allow enough clearance.

Not only does this small opening allow the opening position in embodiments to be moved down towards the center of gate 102, the lower/centered opening position in carabiner body 110 is a specific and important design feature that improves the security of carabiner 100. Embodiments have an opening position that is away from the end of the gate and towards the center of the gate. Ideally, the gate opening is positioned as far away from the end of the gate to still allow sufficient access to the carabiner for loading and unloading keys, and other relevant objects.

This new position of opening 104 improves the security of carabiner 100 by increasing the distance from the swinging or opening end 114 of gate 102 to the actual opening 104 in carabiner body 110. If the key (or other object or force) somehow or inadvertently lifts up the gate and the key makes its way past or under the end of gate 102, it has to travel a longer distance to the opening to escape. And since the spring force from the spring gate 102 in the direction of closing increases as it gets closer to the pivot point 112, the key has a more difficult time exiting the carabiner due to the lower opening position. The spring force is increasing in general as the gate 102 opens and the gate 102 is pushing with increasing force in the direction to push the key back onto/into the carabiner.

The combination of the smaller/optimized gate opening 104 and the lower, more centered position of the gate opening 104, as disclosed above, effectively forms the "extended" length of gate rest extension 125. If both of the gate opening size and position are used as disclosed above, gate rest extension 125 can be an optional feature in combination, but if the opening size is not optimized or cannot be optimized for some applications, gate rest extension 125 on its own contributes to optimization. The extended portion of the gate rest effectively moves the opening in the carabiner body down or away from the gate opening. This feature gives the embodiments all of the enhanced security features disclosed above except the benefit that comes solely from the small/optimized gate opening, including: support for the wire gate from the carabiner body; a longer path for the key or object to fall off the carabiner; and the opposing forces of the gate when exiting the carabiner. In carabiner 100 of FIG. 1, gate rest extension 125, measured at 169 from opening 104 to the center of notch 120 is approximately 0.20", and in other embodiments has a range of approximately 0.15"-0.20". In general, in embodiments, extension 125=[(length of gate 168)−(size of gate opening 104)]/2.

As disclosed, when keys, rings and similar objects are on known carabiners, it is often very easy for them to accidently come off of the carabiner at the top of the opening near the swinging end of the gate with a simple twist. This is particularly common with known carabiners that accept keys directly onto their body (and with known carabiners that hold keys indirectly on split rings, etc.). This vulnerability exists for a number of reasons including: the opening in the body is close to the swinging end of the gate and there is very little overlap between the two components (and support for the wire gate from the carabiner body); and the small amount of unintended looseness and movement of the gate in the non-swinging, sideways direction is largest at the end of the gate causing it to separate easily from the carabiner body in that location, where some of this movement is from the inherent flexibility in the wire gate which results in the most unwanted sideways movement of the gate at the swinging end. All these factors contribute to the gate being able to be moved accidentally by the objects (e.g., keys) on the carabiner and external forces such as those applied by objects in the users pockets and inadvertently opened, resulting in the gate inadvertently opening and in the loss of the objects on the carabiner.

Another way that keys and objects fall off is simply due to the design of the known carabiners which causes some keys and rings to simply open the gates and fall off when twisted due to the way the parts happen to line up during the twisting action. In contrast, the novel position of opening 104 in carabiner body 110 in embodiments eliminates or greatly reduces the ability of keys and objects to accidently fall off the carabiner in such manners or by any other accidental way. The geometry in embodiments acts to block the keys from opening the carabiner when the keys are rotated and twisted, even when intentionally trying to get them off of the carabiner without intentionally opening it to properly remove them. This is in contrast to known carabiners where the keys can easily be rotated and twisted to cause the them to come off of the carabiner without opening it to properly remove them.

In embodiments, gate rest notch 120 is designed so that when the end 114 of gate 102 rests in notch 120, its outer surface is approximately flush with the inner edge of the carabiner body or slightly sub-flush (i.e., when the depth of gate rest notch 120 is greater than the wire diameter of wire gate 120). This recessed position makes it difficult for the key to catch or pass under the end 114 of gate 102 to open it, since the top of gate 102 at 114 sits approximately flush to carabiner body 110. This contributes to the security because it is difficult for a key to lift gate 102 to get under it and move to the opening in the body and inadvertently fall off the carabiner. In embodiments, the depth of notch 120, at its maximum point relative to the inner surface of carabiner body 110, is approximately 0.047" and the diameter of the wire forming gate 102 is also approximately 0.047".

In the cases where a full depth or ideal notch cannot be achieved, the deeper the notch the better to improve the security, with the ideal minimum depth being deep enough so that no more than half the diameter of wire gate 102 protrudes from the gate rest notch, or the depth of the gate rest notch is nominally a minimum of ½ the diameter of the wire of the wire gate. If this is achieved, the gate will effectively offer no "lead in" or path for the keys on the carabiner to catch or get under the gate and inadvertently open the gate. Instead, the keys will be inclined to roll over the end of the gate instead of lifting it and going under it and will also push it in the closed direction. In some embodiments, 50% of the diameter of gate 102 is the minimum depth needed to achieve some benefits.

In embodiments the depth of the gate rest notch is shown as ranging between approximately deep enough for the end of the gate to be completely flush to slightly protruding from the notch. An ideal depth of the notch, not shown in the embodiments of FIGS. 1-6, is deep enough so the end of the gate is sub flush with the inner edge of the carabiner body, while ensuring that there is sufficient material remaining so the carabiner body does not become weakened. In embodiments, this "ideal" depth is 125% of the gate diameter, but can be as deep as 150% of the gate diameter. For example, in carabiners that are key optimized, the carabiner body is typically about 0.11" wide and there is a need for a minimum of about 0.04" remaining for strength. Therefore, if the wire is 0.047" diameter, 1.5×0.047=0.0705. Add 0.04" to that and the result is about 0.11".

In embodiments, the width of notch 125 is approximately 15% above the wire diameter, and in other embodiments the width is approximately 125-150% of the diameter of gate 102.

In embodiments, gate 102 intersects a portion of body 110 at the opening at an angle of less than 180°, less than 160°, or less than 140°, such that an object sliding along the body towards the opening does not open the gate.

Embodiments of the invention include novel angles 165, 166 on the inner edges of opening 104 in the carabiner body in the upwards/right direction as shown in FIG. 1B. The angled opening is non-perpendicular in relation to the long side of body 110. In one embodiment, the angles 165, 166 are approximately 13.0°. The angles of each side are similar, which results in the inner edges of the gate opening being parallel to each other. Parallel is optimal to keep the opening at its minimal functional size, for reasons disclosed above, but not necessary.

Angles 165, 166 specifically allow the width 170 of the overall carabiner to be reduced, and because the width is reduced, the overall size of the carabiner is reduced while keeping the desired/aesthetic aspect ratio. It is also desirable to keep the overall size minimal because embodiments are designed to be used with keys, etc. and they need to be small so a number of them can fit on a keyring and be placed in a pocket, and also function as links/connectors as disclosed below.

The novel angles 165, 166 in the opening in embodiments guide the keys at a slight upward angle from horizontal (in the direction of the where the gate opens) when they are loaded on the carabiner, and there is more clearance in this direction. Gate 102 does not need to swing in as far a distance at this and similar angles. Without the angle, gate 102 needs to swing in further, and some keys will cause the swinging end of the gate to hit the right inner side of the carabiner body before the key has enough clearance to make it onto the carabiner body. In contrast, if the angles were in the downwards direction instead of the upwards direction, it would be increasingly difficult to load the keys onto the carabiner. The small angles allow the keys to enter the carabiner at a specific range desired angles while keeping the gate opening small.

This reduced overall carabiner size is an important element because a carabiner designed specifically to hold 1-2 keys and/or function as a link that connects keys to a larger keyring needs to be very small or it would be too cumbersome for its intended application and not be useful. The slight upwards angle in embodiments allows for keys to enter the carabiner more easily while maintaining most or all of the security from the other design features disclosed above. The less desirable alternative to the angle in embodiments would be a larger gate opening which would reduce the security for the reasons discussed above. The nominal angle or angle commonly used on the edges of the gate openings in these embodiments is 90 degrees or approximately perpendicular to the edges of gate opening. This angle is optimal for most embodiments as it optimizes for ease of loading the keys and ease of removing the keys. The specific angle and range of angles disclosed above are used in embodiments where there is a need for a smaller carabiner.

In embodiments, carabiner body 110 is intentionally sized small enough, on the cross-sectional dimensions, to accept keys directly on the carabiner. This functions similarly to a split ring in this manner. In contrast, many known carabiners do not accept keys directly and need the keys to be on a split ring and the split ring placed on the carabiner.

Figure 2A:
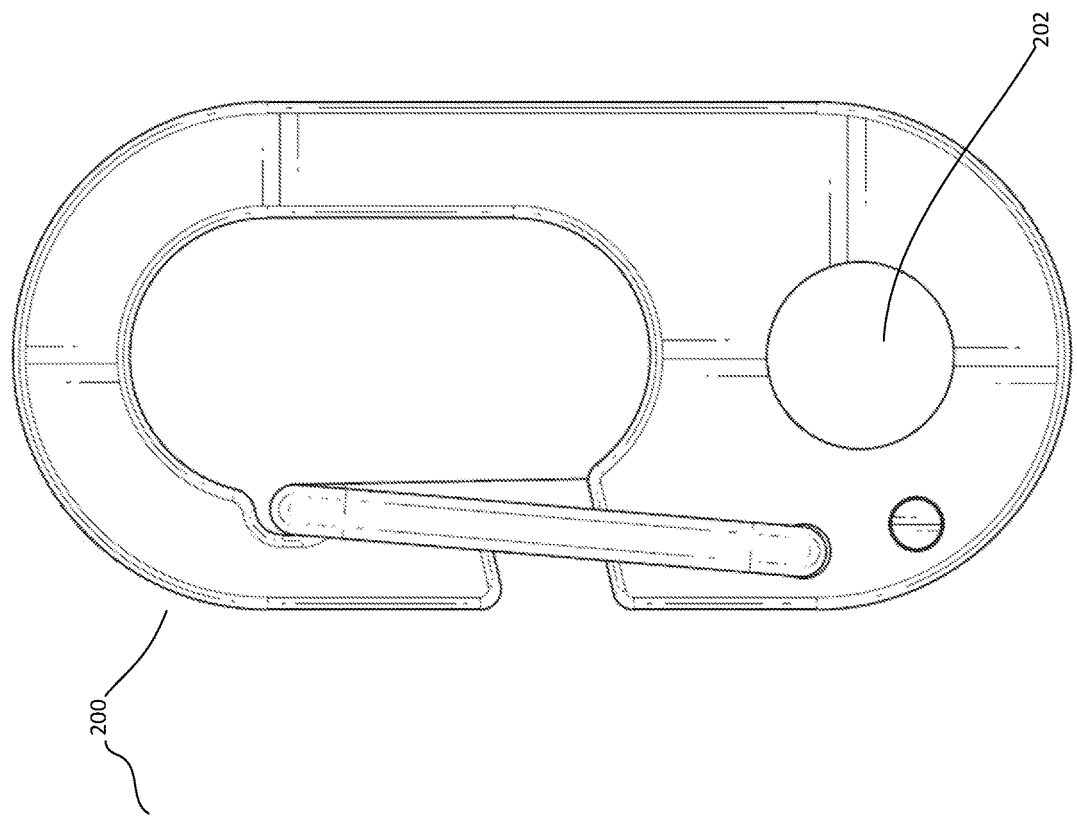
FIG. 2A is a perspective view and FIG. 2B is a side view of a carabiner in accordance to an embodiment.
Figure 2B:
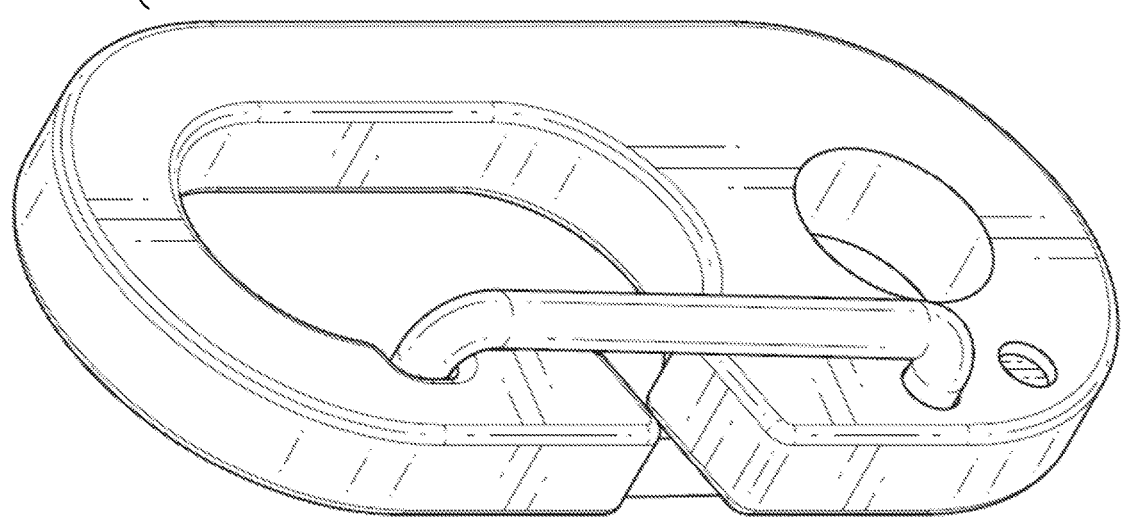

FIG. 2A is a perspective view and FIG. 2B is a side view of a carabiner 200 in accordance to an embodiment. Carabiner 200, in general, is similar to carabiner 100 of FIG. 1 with the addition of an integrated eyelet 202. Integrated eyelet 202 allows carabiner 200 to be used on a split ring, cord or fob. If used on a split ring, the eyelet allows carabiner 200 to stay better aligned and incur less extraneous movement than carabiner 100. Further, integrated eyelet 202 provides another layer of security because it is not possible for eyelet 202 to ever open and for the entire carabiner to inadvertently fall of the split ring, cord or fob.

Figures 3A, 3B:
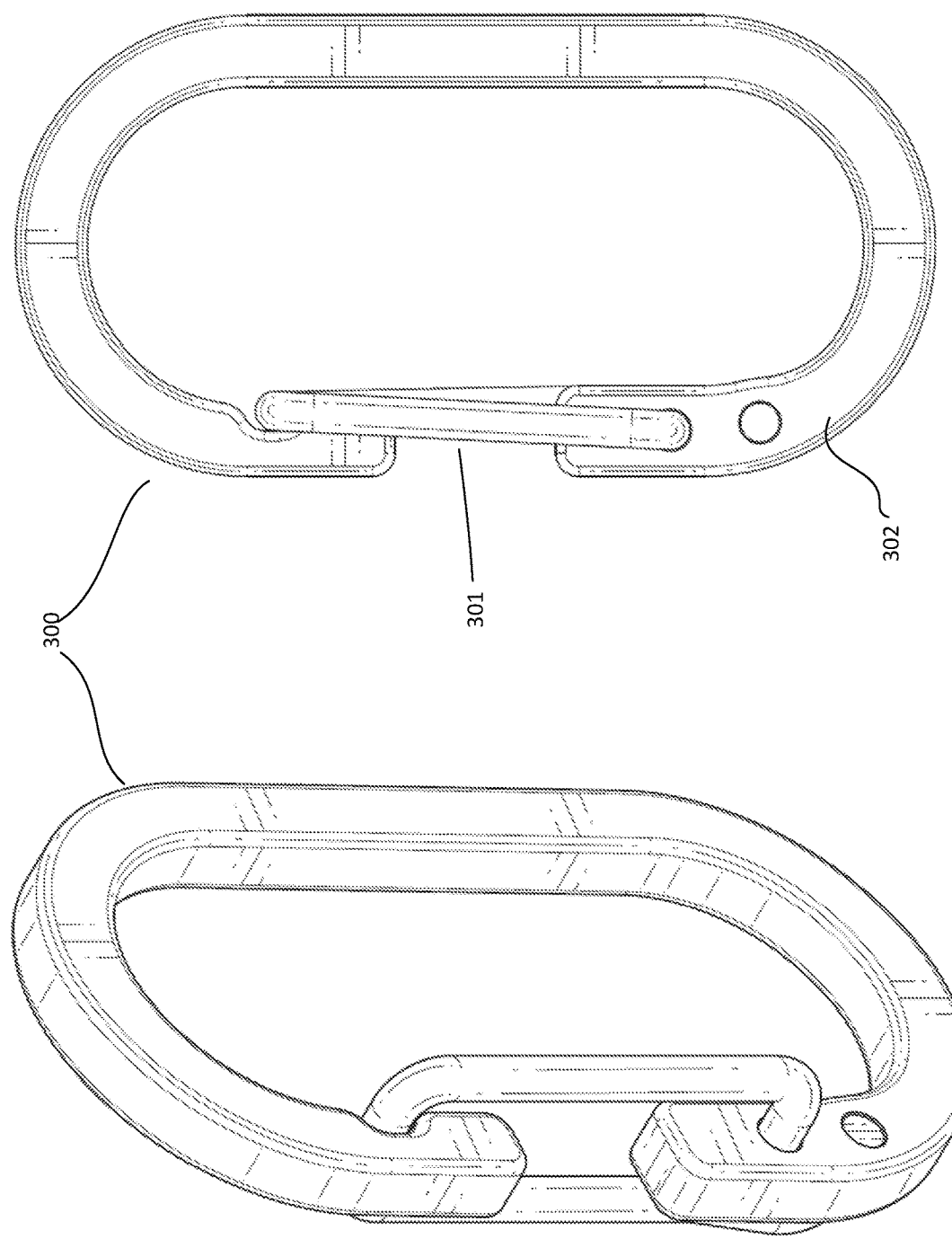
FIG. 3A is a perspective view and FIG. 3B is a side view of a pet identification tag carabiner in accordance to an embodiment.

FIG. 3A is a perspective view and FIG. 3B is a side view of a pet identification tag carabiner 300 in accordance to an embodiment that is adapted to be used for attaching objects, such as identification tags, tracking devices and lights onto pet collars. Carabiner 300, in general, is similar to carabiner 100 of FIG. 1. However, carabiner 300 does not need the entrance angles 165, 166 of FIG. 1 because it is not size constrained as the carabiners adapted to hold keys. The large diameter of the common D-Rings on dog collars is one reason carabiner 300 needs to be larger overall. Although the opening 301 on the body 302 is much larger (i.e., 0.2") than on the key versions of carabiners 100 and 200, it shares all the other design principles and properties, such as the opening is minimized for the specific application, the gate opening position is moved down and centered, the gate rest notch is recessed, the extended gate rest extension, etc. The presence of these properties result in a very secure carabiner that holds identification tags and other objects on a pet collar and that is easier to use than a split ring. Identification tags on a pet collar is a challenging environment because, similar to keys on a key ring, they get shaken and jostled and can easily be lost if not secure. Similar to keys, it is also very important for the pet not to lose its identification tags or tracking device.

The pet identification tag carabiner 300 embodiment is "tag optimized" or thin enough to accept a pet tag directly on it, and eliminates the need for the small split ring that typically come with the tags which are very difficult to use (because they are difficult to open using fingers). Further, without the split ring, the actual dog/pet tag sits in the proper forward facing orientation on the collar. The small split rings are also a potential failure point because they need to be manufactured from a very thin and potentially weak wire diameter in order to be able to flex enough to open. Another embodiment that has all the other features and is not "tag optimized" and has a thicker body may be useful for some users because of the extra strength. Carabiner 300 can also be made in different shapes such as round and function well.

Figure 4B:
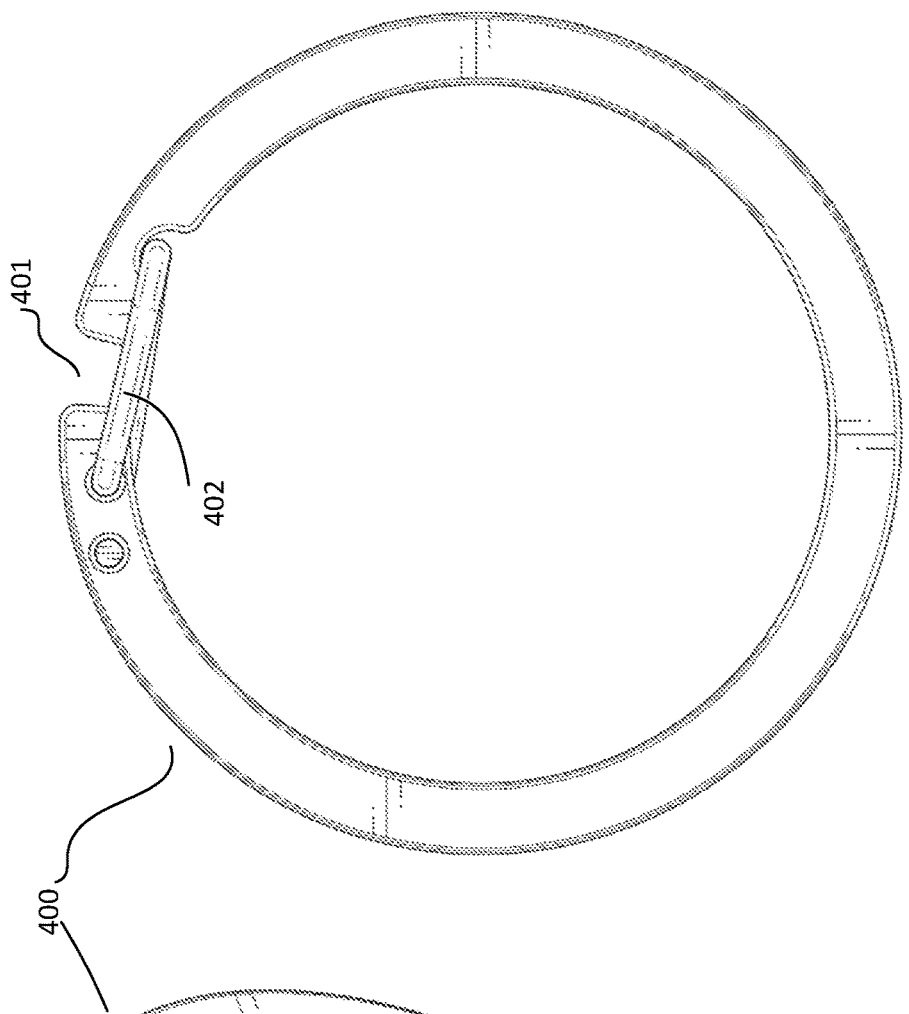
FIG. 4A is a perspective view and FIG. 4B is a side view of a ring carabiner in accordance to an embodiment.
Figure 4A:
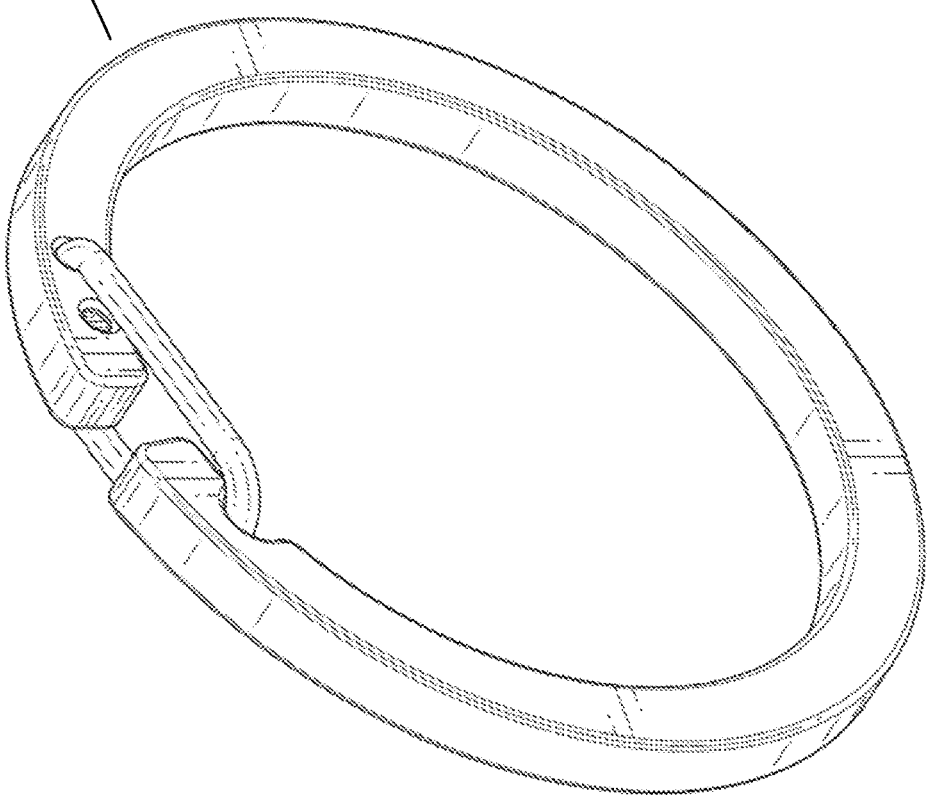

FIG. 4A is a perspective view and FIG. 4B is a side view of a ring carabiner 400 in accordance to an embodiment. Carabiner has all of the novel features disclosed in conjunction with carabiner 100 of FIG. 1, except the presence of angles 165, 166 on the gate opening 401. The intended use of this embodiment is not primarily as a link to attach keys to another object but rather as a keyring itself. It is intended to hold one or more keys together in a similar manner as a known split ring. The benefits of this over a known split ring is that it is much easier to load and unload keys and other objects while maintaining the necessary level of security disclosed above due to novel features. Carabiner 400 does not need edges of opening 401 angled as with carabiner 100 because its overall size does not need to be minimized for its intended use. Embodiments using this design work with key optimized and non key-optimized (i.e., fatter body) carabiners and also with carabiners of other shapes besides round.

In comparison to the embodiments of FIGS. 1-3, the length of the gate 402 of carabiner 400 is smaller and a minimal size to be used with keys. In embodiments, the size of opening 401 is approximately 0.1" and of gate 402 is approximately 0.412" This smaller gate size gives an aesthetic benefit by allowing the design to better approximate a circle. The smaller gate size also increases the effective stiffness of the gate's spring force which further improves it security.

FIG. 5A is a perspective view and FIG. 5B is a side view of a ring link carabiner 500 with a strap 502 in accordance to an embodiment. In addition to having all the features of ring carabiner 400 disclosed above, embodiments include a flat portion 504 in the carabiner opening and a gate region that provides additional security (or stand-alone security) because of the interaction of the flat portion 504 with a loop 506 on the strap 502 when the ring is rotated so that the flat portion 504 is positioned under the loop 506. A tight or snug loop on the strap holds the gate opening/flat region of the ring secure inside the loop so keys cannot access the opening in the carabiner body or accidentally fall of the carabiner portion. The tight or snug loop in the strap is sized properly so that the user can easily slide it off and over the flat portion when loading and unloading keys and other objects onto the ring.

Embodiments using this design work with key optimized and non key-optimized (i.e., fatter body) carabiners and also with carabiners of other shapes besides round. The stand-alone security means that this embodiment would function securely even if the carabiner opening did not have any of the specific features disclosed above in conjunction with carabiner 100 and rather had common carabiner opening features on the flat region. This is because the ability of the tight or snug loop on the strap to stay in place on the flat portion when in normal use makes the other novel features redundant or not required. However, a combination of all the features is optimal for security. Further, the hidden gate and gate opening (when covered by the fob loop) may improve the look of the device.

Figures 6A, 6B:
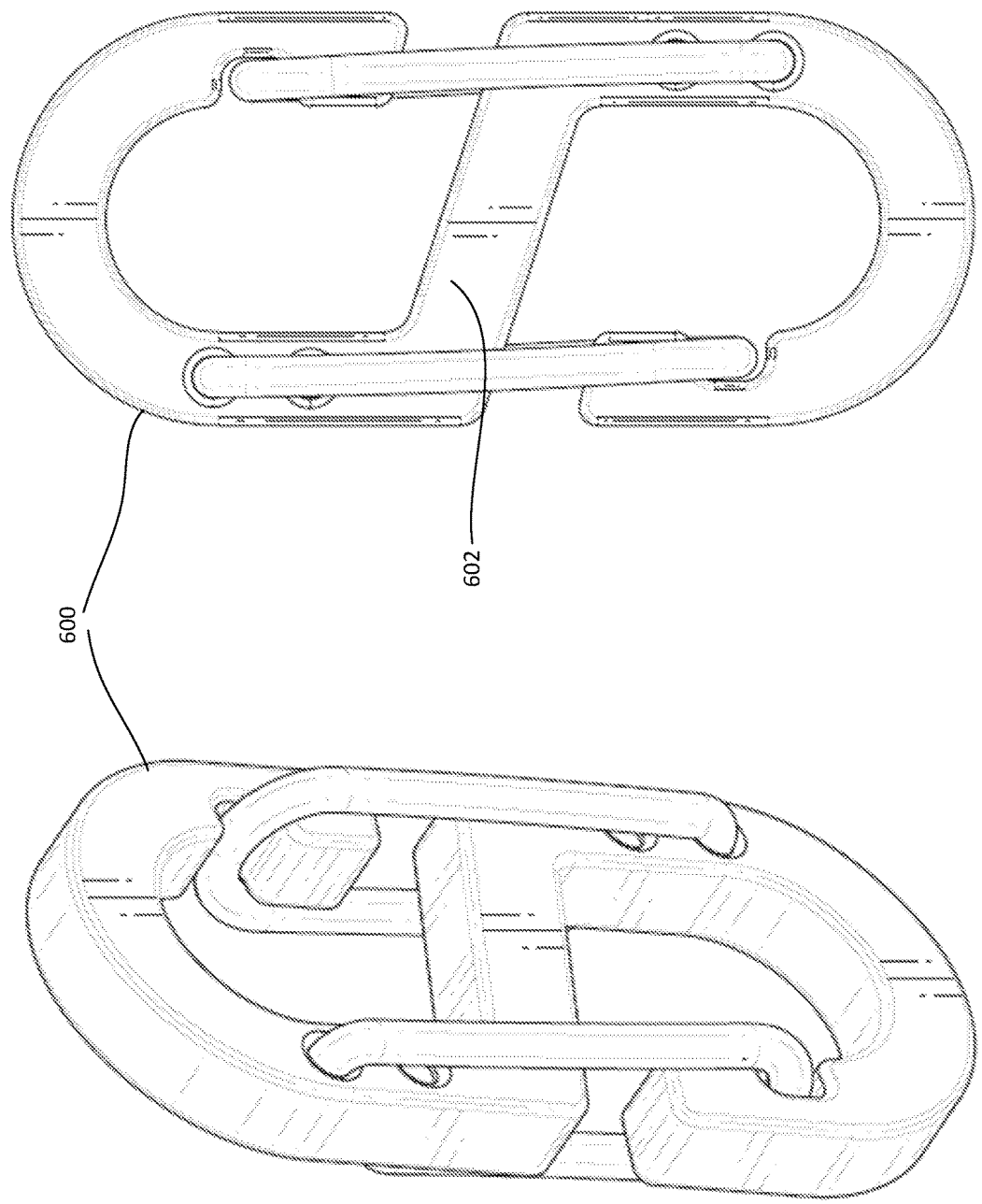
FIG. 6A is a perspective view and FIG. 6B is a side view of an S shaped carabiner in accordance to an embodiment.

FIG. 6A is a perspective view and FIG. 6B is a side view of an S shaped carabiner 600 in accordance to an embodiment. Carabiner 600 is a two chamber version of carabiner 100 and incorporates all novel features of carabiner 100.

In one embodiment, a cross bar 602 in the center, which divides the two chambers, uses the identical angle as the angles 165, 166 of carabiner 100. This allows it to be optimized for the small size needed for its intended uses, which are similar to carabiner 100. Further, keeping the same angle for the center bar functions as a lead-in or guide for loading and unloading keys because it assists in aligning the keys to the proper angle. The angle also improves its aesthetics. Carabiner 600 also performs well at a range of angles and sizes.

As disclosed, embodiments of the invention include one or more novel features to enhance functionality. All of these features can function well though a range of dimensions. The opening in the carabiner body is intended to be as small as possible for the specific intended use or uses, but can operate well and still be a large improvement in security over common carabiners by being a little smaller than the openings on common carabiners. The same principle applies to the position of the opening in the carabiner body. Moving it down towards the center of the gate or base pivot of the gate improves the security and towards the center of the gate is nominally the ideal position for the reasons described, but there are a wide range of positions that can still function well and improve security while maintaining the ability to load and unload objects on and off the carabiner. This is the same for the gate rest notch—it can still function well and provide enhanced security with a range of depths. It is also the same for the angles of the edges of the opening in the carabiner body—the design can function well for a range of angles. It is also the same for the extended gate rest extension—it can still function well with a range of lengths. Carabiners in accordance with embodiments do not require all of these features to be present in every embodiment for this novel carabiner to function in an improved and more secure manner. It is possible for any combination of these featured discussed above to be present for this novel carabiner to function in an improved manner.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A carabiner comprising:
    a carabiner body forming an opening having a width, the carabiner body comprising a gate rest notch, and a gate rest; and
    a pivotable gate coupled to the carabiner body at a pivotable point and adapted to contact the gate rest notch when in a closed position;
    wherein the carabiner body is sized to accommodate an object with an aperture and a thickness, and the width is approximately less than 100% greater than the thickness and is approximately 17%-38% of a length of the gate.

2. The carabiner of claim 1, the gate rest notch having a depth so that when the gate is in a closed position, the gate is approximately flush to an inside of the carabiner body.

3. The carabiner of claim 1, wherein the opening covers approximately a middle portion of the gate.

4. The carabiner of claim 1, wherein the carabiner body has a cross-sectional dimension less than a size of the aperture.

5. The carabiner of claim 4, wherein the object is a key.

6. The carabiner of claim 1, the opening having two sides, an angle of the two sides being non-perpendicular to the carabiner body.

7. The carabiner of claim 1, further comprising an eyelet.

8. The carabiner of claim 1, further comprising a strap having a loop coupled to the carabiner, wherein the loop is adapted to snugly cover the opening when the carabiner body is rotated to prevent the gate from opening.

9. The carabiner of claim 1, wherein the width is approximately 17%-22% greater than the thickness.

10. The carabiner of claim 6, wherein the two sides are parallel.

11. A method of coupling an object to a carabiner comprising:
providing the carabiner, the carabiner comprising a carabiner body forming an opening having a width and forming a chamber, the carabiner body comprising a gate rest notch, and a gate rest, and a pivotable gate coupled to the carabiner body at a pivotable point and adapted to contact the gate rest notch when in a closed position;
wherein the carabiner body is sized to accommodate an object with an aperture and a thickness, and the width is approximately less than 100% greater than the thickness and is approximately 17%-38% of a length of the gate;
placing the gate rest through the object via the aperture; and
sliding the object into the chamber by pivoting the gate to an open position.

12. The method of claim 11, the gate rest notch having a depth so that when the gate is in a closed position, the gate is approximately flush to an inside of the carabiner body.

13. The method of claim 11, wherein the opening covers approximately a middle portion of the gate.

14. The method of claim 11, wherein the carabiner body has a cross-sectional dimension less than a size of the aperture.

15. The method of claim 14, wherein the object is a key.

16. The method of claim 11, the opening having two sides, an angle of the two sides being non-perpendicular to the carabiner body.

17. The method of claim 11, the carabiner further comprising an eyelet.

18. The method of claim 11, the carabiner further comprising a strap having a loop coupled to the carabiner, wherein the loop is adapted to snugly cover the opening when the carabiner body is rotated to prevent the gate from opening.

19. The method of claim 11, wherein the width is approximately 17%-22% greater than the thickness.

20. The method of claim 16, wherein the two sides are parallel.

* * * * *